Patented Oct. 26, 1948

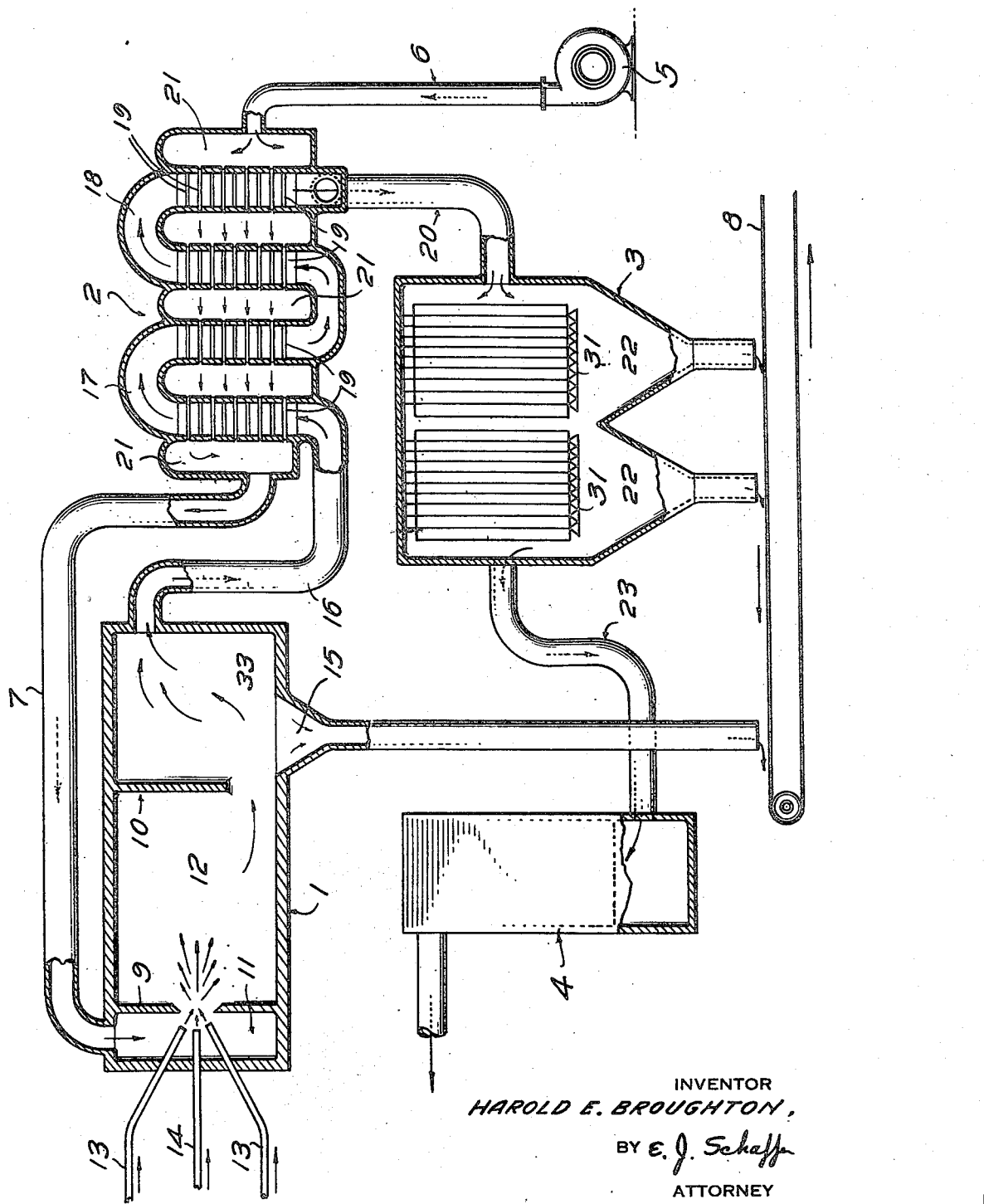

2,452,517

UNITED STATES PATENT OFFICE 2,452,517

WASTE IRON SULFATE SOLUTION RECOVERY

Harold E. Broughton, New York, N. Y., assignor to Chemical Construction Corporation, New York, N. Y., a corporation of Delaware Application April 27, 1946, Serial No. 665,352

4 Claims. (Cl. 23—178)

1

This invention relates to an improvement in the production of $SO_2$ gases suitable for the manufacture of sulfuric acid by the contact process from waste sulfuric acid containing hydrocarbonaceous impurities which comprises enriching the $SO_2$ values from said waste materials with the $SO_2$ value of waste iron sulfate by simultaneously thermally decomposing waste iron sulfate with the waste acids and recovering a gas containing at least a minimum of 10% $SO_2$.

In the various processes for the recovery of the $SO_2$ values from waste sulfuric acid containing hydrocarbonaceous impurities it is extremely difficult to maintain a proper heat balance and at the same time produce gases containing at least the minimum concentration necessary for the manufacture of sulfuric acid by the contact process. For an example, in the recovery of $SO_2$ from the heavy, viscous, acid sludges resulting from the refinement of petroleum with sulfuric acid, the excess of hydrocarbons in relation to the $SO_2$ value of the sludge is so great that upon burning the sludge a gas is produced which will contain only a few per cent of $SO_2$.

In the process for the recovery of $SO_2$ values in the waste alkylation acids from the manufacture of alkylation gasoline described by Nicolay Titlestad in copending application, Serial No. 446,719, filed June 12, 1942, now Patent No. 2,406,930, dated September 3, 1946, the same difficulty is encountered. It has been found that because of the heat balance the waste sulfuric acid from the alkylation process must contain a minimum of 80% sulfuric acid and, in order to avoid the use of additional fuel in the process, preheated air must be used.

I have discovered that the above described difficulties can be overcome by enriching the $SO_2$ content of the gases produced by the above and similar processes with the $SO_2$ value of iron sulfate. This enrichment is accomplished by introducing into the burning waste sulfuric acid containing hydrocarbonaceous material a waste iron sulfate solution such as waste pickle liquors from steel mills and waste sulfate liquors from titanium pigment plants. A primary object of my invention is to accomplish this enrichment.

In its broader aspects my invention is a process for the production of $SO_2$ containing gases which consists of burning a finely divided spray of waste sulfuric acid containing hydrocarbonaceous impurities and introducing iron sulfate into the said burning material, thermally decomposing the waste acid and the iron sulfate and recovering an $SO_2$ containing gas suitable for the manufacture of sulfuric acid by the contact process.

Essentially the invention is an improvement in processes in which waste sulfuric acid containing hydrocarbonaceous impurities is burned as a finely divided spray in a decomposition furnace, pref-

2 erably with the use of preheated air, with enough supplemental fuel where necessary to maintain temperatures in the furnace above 1600° F. but preferably above 2000° F. Into this burning mixture a concentrated solution containing iron sulfate is sprayed and both the waste acid and iron sulfate are decomposed simultaneously into gaseous sulfur dioxide. The products of combustion, containing the sulfur dioxide, water vapor, carbon dioxide and substantial quantities of iron oxides as a fine dust, are passed into a settling chamber where a major portion of the iron oxide is removed. The gases are then preferably led to a heat recuperator in which the air necessary for the combustion is preheated and the hot gases are cooled. From the recuperator the gases are passed into a dust collector where substantially all the remaining dust is removed and then to a scrubbing and cooling tower where the gases are scrubbed with water or a weak acid solution. The clean gases leaving the scrubbing tower will contain a minimum of 10% $SO_2$ but preferably from 10–15% $SO_2$ and are in a suitable condition to be passed to a plant where they may be used to manufacture sulfuric acid by the contact process.

Instead of using the heat of the gases from the combustion furnace to preheat the air going into the furnace a waste heat boiler may be used to generate steam or to concentrate the waste sulfate liquor. In any event it is necessary to cool the gases to avoid excessive temperatures in the dust collector which is a Cottrell precipitator. If the air is not preheated, more supplemental fuel may be used or a sludge having a higher heating value may be used and in such cases more waste iron sulfate can be introduced into the decomposition furnace and still satisfy the heat balance requirements and yield a gas containing a minimum of 10% $SO_2$.

The phrase "waste sulfuric acid containing hydrocarbonaceous impurities" is intended to mean any waste sulfuric acid resulting from the refinement of petroleum with sulfuric acid or any other waste sulfuric acid which contains hydrocarbonaceous impurities which upon burning have a heating value. This definition is not intended to exclude any waste sulfuric acid which is mixed with a fuel as the hydrocarbonaceous material.

Any liquor containing iron sulfate can be used in the process of my invention. However, it is particularly applicable to waste pickle liquor and to the waste sulfate liquors from titanium pigment plants. The iron sulfate in these waste liquors is present principally as ferrous sulfate but ferric sulfate or mixtures of ferrous and ferric sulfate can be used in my process and any of these liquors may contain varying percentages of sulfuric acid.

The average pickle liquor from a steel mill contains about 14–16% iron sulfate, 2–5% sulfuric acid, and 79–84% water. This solution may be sprayed as such into the decomposition furnace but the quantity that can be used is not as great as when the solution is concentrated. I have found that it is preferable to concentrate the waste sulfate liquors to such an extent that at normal conditions of temperature and pressure they will form a pumpable sludge and this is also necessary for the waste sulfuric acid containing hydrocarbonaceous impurities. The limit of the ratio of the waste acid liquor to the iron sulfate solution that may be used in the process is such that the gases that are passed to the sulfuric acid plant where they will be converted to sulfuric acid by the contact process will contain a minimum of 10% $SO_2$.

One of the most important advantages of my process is that the recovery of $SO_2$ values from waste sulfuric acids containing hydrocarbonaceous impurities is possible when the ratio of the $SO_4$ content to that of the hydrocarbon vary over a wide range. Heretofore, because of the heat balance requirements of the process, only such waste acids could be used that had a ratio of $SO_4$ to hydrocarbon content that upon combustion and decomposition a gas containing at least 10% $SO_2$ could be recovered. By my process heavy acid sludges having a high hydrocarbon and a low $SO_2$ value may be enriched by the $SO_2$ values of waste iron sulfate. On the other extreme waste alkylation acid or other waste sulfuric acid need not contain a minimum of 80% $H_2SO_4$. A lower sulfuric acid content and a higher percentage of hydrocarbons may be present in these acids since waste iron sulfate as needed can be introduced in the burning step and gases containing at least 10% $SO_2$ can be recovered from the products of combustion.

Another advantage of my process is that no excess air is needed for the formation of iron oxides which result from the reaction since there is enough oxygen in the sulfate to satisfy the oxygen requirements for the iron and at the same time to supply additional oxygen for the carbon that reduces the sulfate in the reaction.

Apparatus in which my process may be carried out is shown in the accompanying drawing the single figure of which is a flow sheet in which various pieces of equipment are illustrated diagrammatically. It should be understood, however, that the drawing is given primarily for illustration purposes and that my invention in its broader aspects is not limited thereto.

Referring to the drawing, 1 is a suitably insulated furnace in which waste sulfuric acid containing hydrocarbonaceous impurities and any supplementary fuel that may be necessary are burned and into which iron sulfate is sprayed. The products of combustion are led to the heat recuperator 2 and then to a dust collector 3 and from there into a scrubbing and cooling tower 4 from which an $SO_2$ containing gas suitable for the manufacture of sulfuric acid by the contact process is drawn. Air is supplied to the furnace by blower 5, passing first to the heat recuperator 2 through duct 6 and into the furnace through duct 7. A dust conveyor 8, which as shown here is a conveyor belt but which may be a pneumatic conveyor or any other type of suitable conveying apparatus, carries away the dust that collects in furnace 1 and dust collector 3.

Furnace 1 is provided with baffles 9 and 10, the effect of which is to divide it into chambers 11, 12, and 33. In order to avoid the building up of carbon deposits in chamber 12, the waste sulfuric acid containing hydrocarbonaceous impurities may be introduced into chamber 11 in an atomized stream by spray burners 13. The iron sulfate is similarly introduced by spray nozzle 14. The principal function of chamber 11 is to allow the preheated air to mix with the finely atomized waste acid and the iron sulfate. The mixture is ignited as it passes into chamber 12 and combustion and thermal decomposition are carried to completion in passing through this chamber. In the dust settling chamber 33 a major part of the iron oxides formed by the reaction settle out of the gases and fall into hopper 15 from which they are dropped on conveyor 8.

The hot products of combustion leave the furnace through duct 16 and enter heat recuperator 2 in which air to be preheated flows countercurrently to the hot gases leaving the furnace. The hot gases pass through ducts 17 and 18 in which suitable ceramic tubes 19 are disposed substantially as shown and are passed into dust collector 3 through duct 20. Cold air enters the recuperator from duct 6 and passes into chamber 31, through the tubes 19 where it is heated by the hot gases from the furnace to temperatures of 800–1600° F. or higher and enters duct 7 and is led into furnace 1. Access doors, not shown, are provided in the furnace, the heat recuperator, and all the flues so that iron oxide that collects there may be removed. As stated above, instead of a heat recuperator a waste heat boiler may be used to produce steam or to concentrate the waste sulfate liquors instead of preheating the air.

The dust collector 3 is preferably a Cottrell precipitator in which dust and fumes collect on plates 21 and fall into hoppers 22 and from there to conveyor 8. The dust free $SO_2$ containing gases pass through duct 23 into scrubbing tower 4 where they are scrubbed with a weak solution of sulfuric acid after which they are passed to an acid plant where the $SO_2$ is converted to sulfuric acid by the contact process.

It will be noted that my invention provides a method for disposing of waste sulfate liquors such as result from the pickling operation in a steel mill or waste titanium pigment plant liquors by using them to enrich the $SO_2$ content of gases that are produced from the thermal decomposition of waste sulfuric acid containing hydrocarbonaceous impurities. It will be noted too that waste acids can be used when the hydrocarbon and the $SO_4$ content vary widely.

What I claim is:

1. A process for the production of an $SO_2$ containing gas which comprises burning with preheated air a finely divided stream of waste sulfuric acid containing hydrocarbonaceous impurities and introducing into said burning material as a fine spray a waste solution of iron sulfate, thermally decomposing said waste acid and said iron sulfate and recovering therefrom an $SO_2$ containing gas suitable for the manufacture of sulfuric acid by the contact process.

2. A process for the production of an $SO_2$ containing gas suitable for the manufacture of sulfuric acid by the contact process which comprises burning a finely divided stream of waste sulfuric acid containing hydrocarbonaceous impurities and introducing into said burning material as a fine spray a waste solution of iron sulfate, thermally decomposing at temperature above 1600° F. said waste acid and said iron sulfate and recovering therefrom a gas containing a minimum of 10% $SO_2$.

3. A process for the production of an $SO_2$ containing gas suitable for the manufacture of sulfuric acid by the contact process which comprises burning with preheated air a finely divided stream of waste sulfuric acid containing hydrocarbonaceous impurities, introducing into said burning material as a finely divided spray a waste solution of iron sulfate, thermally decomposing said waste acid and said iron sulfate at temperatures above 1600° F., allowing a major part of the iron oxide formed by said decomposition to settle out of the gases resulting from said combustion and said thermal decomposition, cooling said gases with the air to be used in said combustion and thereby preheating said air, then removing substantially all of said iron oxide dust from said gases, scrubbing and further cooling said gases with a weak solution of sulfuric acid and recovering a gas containing a minimum of 10% $SO_2$.

4. A process for the production of an $SO_2$ containing gas suitable for the manufacture of sulfuric acid by the contact process which comprises burning a finely divided stream of waste sulfuric acid containing hydrocarbonaceous impurities, introducing into said burning material as a finely divided spray a waste solution of iron sulfate, thermally decomposing said waste acid and said iron sulfate at temperatures above 2000° F., allowing a major part of the iron oxide formed by said decomposition to settle out of the gases resulting from said combustion and said thermal decomposition, cooling and removing a major part of the heat in said gases, then removing substantially all of said iron oxide dust from said gases, scrubbing and further cooling said gases with a weak solution of sulfuric acid and recovering a gas containing a minimum of 10% $SO_2$.

HAROLD E. BROUGHTON.

REFERENCES CITED

The following references are of record in the file of this patent:

UNITED STATES PATENTS

| Number | Name | Date |
|---|---|---|
| 1,813,649 | Weise | July 7, 1931 |
| 2,021,725 | Heehenbleiknee | Nov. 19, 1935 |
| 2,044,419 | Clark | June 16, 1936 |
| 2,074,061 | Mullen | Mar. 16, 1937 |
| 2,207,610 | Chappell | July 4, 1940 |